United States Patent
Moussakhani et al.

(10) Patent No.: US 10,416,787 B2
(45) Date of Patent: Sep. 17, 2019

(54) INTERACTIVE PROJECTOR, INTERACTIVE PROJECTION SYSTEM, AND INTERACTIVE PROJECTOR CONTROL METHOD

(71) Applicant: SEIKO EPSON CORPORATION, Tokyo (JP)

(72) Inventors: Babak Moussakhani, Trondheim (NO); Tormod Njolstad, Trondheim (NO)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/561,321

(22) PCT Filed: Mar. 11, 2016

(86) PCT No.: PCT/JP2016/001396
§ 371 (c)(1),
(2) Date: Sep. 25, 2017

(87) PCT Pub. No.: WO2016/157759
PCT Pub. Date: Oct. 6, 2016

(65) Prior Publication Data
US 2018/0101246 A1 Apr. 12, 2018

(30) Foreign Application Priority Data
Mar. 27, 2015 (JP) ................................ 2015-065625

(51) Int. Cl.
*G06F 3/0346* (2013.01)
*G06F 3/042* (2006.01)
(Continued)

(52) U.S. Cl.
CPC .......... *G06F 3/0346* (2013.01); *G06F 1/1639* (2013.01); *G06F 1/1645* (2013.01);
(Continued)

(58) Field of Classification Search
CPC ........ G06F 3/041; G06F 3/042; G06F 3/0346; G06F 3/0325; G06F 3/005; G06F 3/01;
(Continued)

(56) References Cited

U.S. PATENT DOCUMENTS

| | | | | |
|---|---|---|---|---|
| 6,558,006 B2* | 5/2003 | Ioka | ....................... | G03B 21/13 348/E9.027 |
| 7,034,807 B2* | 4/2006 | Maggioni | ............. | G06F 3/0428 345/156 |

(Continued)

FOREIGN PATENT DOCUMENTS

| | | |
|---|---|---|
| JP | 2003-36142 A | 2/2003 |
| JP | 2008-520034 A | 6/2008 |
| JP | 2012-150636 A | 8/2012 |

OTHER PUBLICATIONS

Jan. 11, 2019 Search Report issued in European Application No. 16771653.9.

*Primary Examiner* — Jimmy H Nguyen
(74) *Attorney, Agent, or Firm* — Oliff PLC

(57) ABSTRACT

An interactive projector includes a projection unit, a plurality of cameras, a position detection unit that detects a position of the pointing element with respect to the projected screen based on a plurality of images including the pointing element of which the image is captured, a function calculation unit that calculates a curved-surface function representing a three-dimensional shape of the projected screen based on a captured image including a specific image captured when the specific image is projected, and a contact detection unit that detects contact of the pointing element with the projected screen using the position of the pointing element detected by the position detection unit and the curved-surface function calculated by the function calculation unit, and the function calculation unit detects three-dimensional positions of a plurality of reference points, on (Continued)

the projected screen based on the captured image including the specific image and calculates the curved-surface function.

10 Claims, 7 Drawing Sheets

(51) Int. Cl.
*G06F 3/03* (2006.01)
*H04N 9/31* (2006.01)
*G06F 1/16* (2006.01)
*G06F 3/0354* (2013.01)

(52) U.S. Cl.
CPC ........ *G06F 3/0325* (2013.01); *G06F 3/03542* (2013.01); *G06F 3/03545* (2013.01); *G06F 3/042* (2013.01); *G06F 3/0425* (2013.01); *H04N 9/31* (2013.01)

(58) Field of Classification Search
CPC ....... G06F 1/1639; G06F 1/1645; H04N 9/31; H04N 9/093; H04N 9/3194; H04N 9/3179; H04N 5/247; H04N 5/2256
USPC ........................................................ 345/156
See application file for complete search history.

(56) References Cited

U.S. PATENT DOCUMENTS

| | | |
|---|---|---|
| 8,436,836 B2 | 5/2013 | Njolstad et al. |
| 2002/0021287 A1* | 2/2002 | Tomasi ................. G06F 1/1613 345/168 |
| 2009/0300531 A1* | 12/2009 | Pryor ..................... G06F 3/011 715/764 |
| 2012/0112994 A1 | 5/2012 | Vertegaal et al. |
| 2013/0162538 A1* | 6/2013 | Ichieda ................... G06F 3/033 345/163 |

* cited by examiner

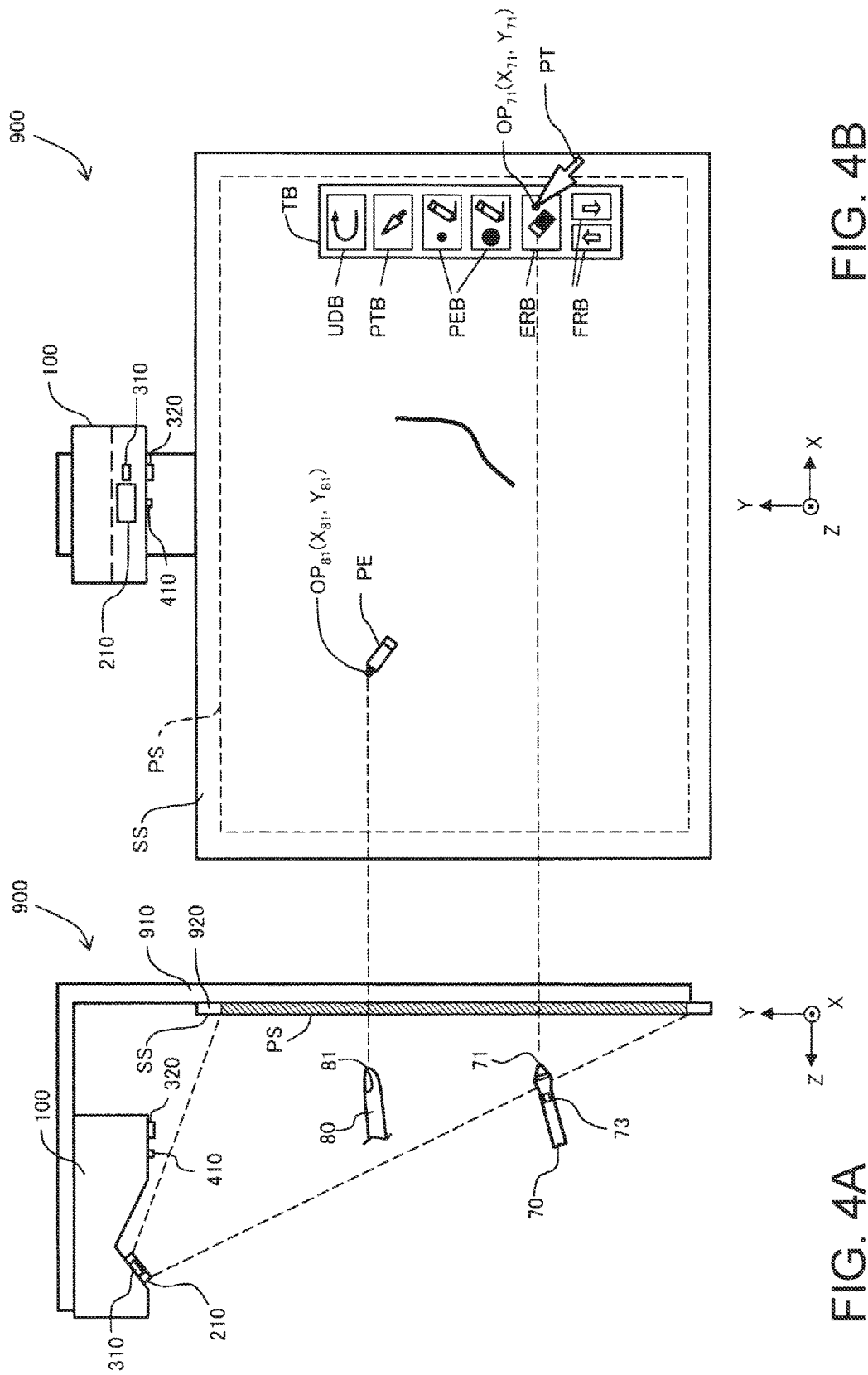

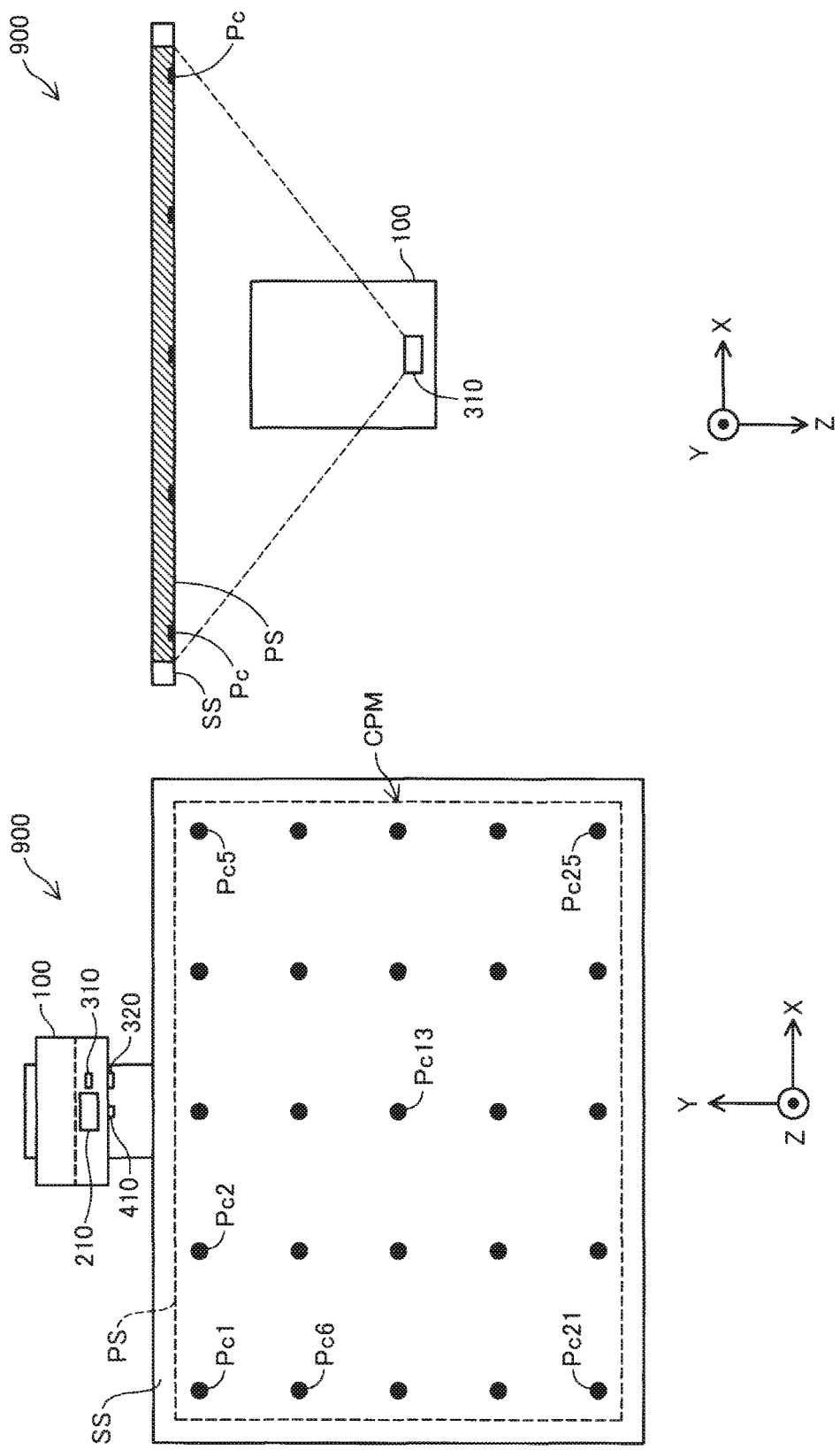

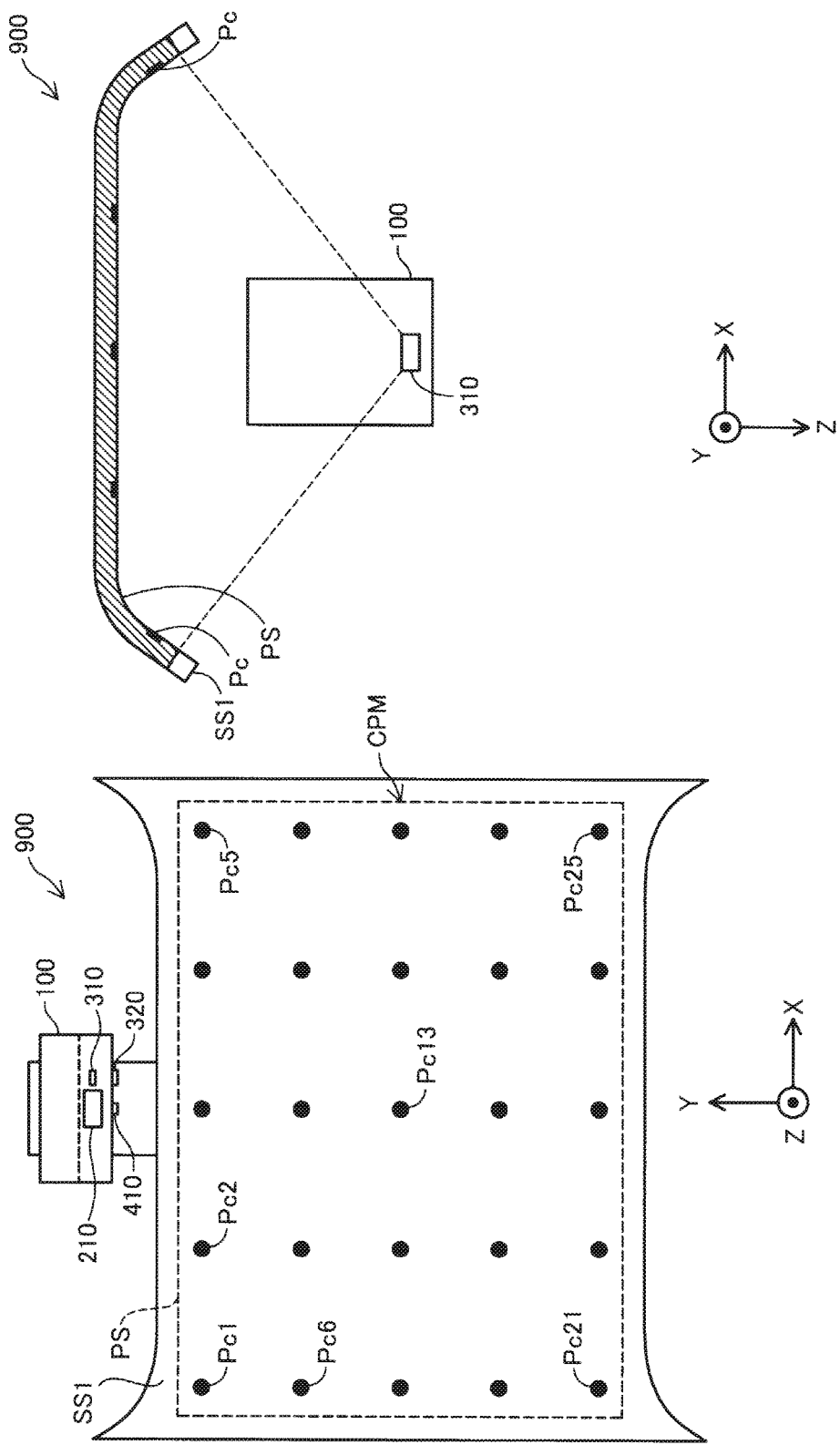

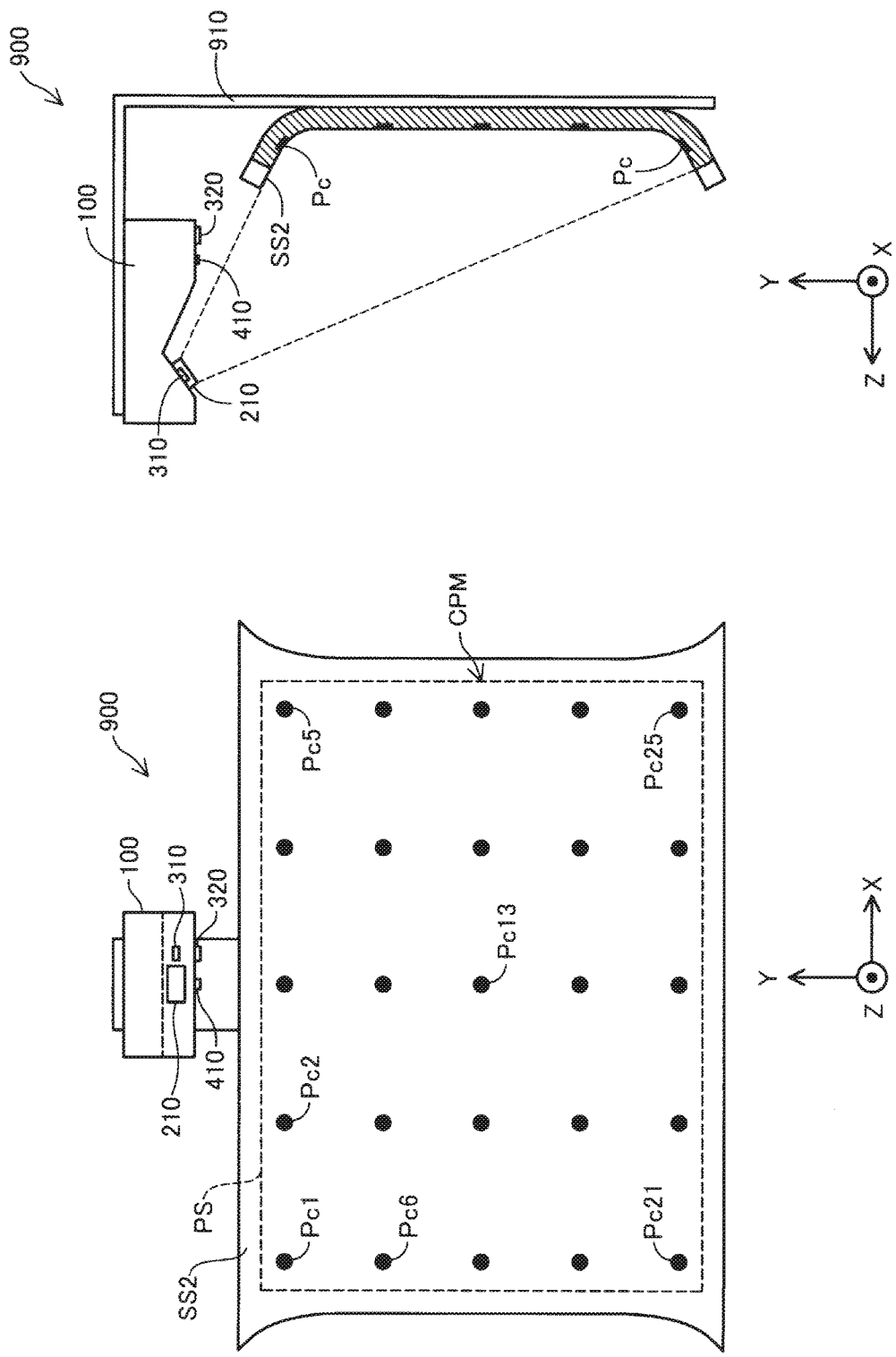

INTERACTIVE PROJECTOR, INTERACTIVE PROJECTION SYSTEM, AND INTERACTIVE PROJECTOR CONTROL METHOD

TECHNICAL FIELD

The present invention relates to an interactive projector capable of receiving an instruction by a pointing element of a user with respect to a projected screen, a system thereof, and a control method of the projector.

BACKGROUND ART

In PTLs 1 and 2, a projection type display device (projector) which projects a projected screen on a screen and captures an image including an object such as a finger or a pen which emits light by a camera so as to make it possible to detect a position of the object using the captured image is disclosed. The object such as the finger is used as the pointing element for giving an instruction to the projected screen. That is, when a tip of the object is in contact with the screen, the projector recognizes that a predetermined instruction such as rendering is input to the projected screen and re-renders the projected screen according to the instruction. Accordingly, the user is able to input various instructions by using the projected screen as a user interface. As such, a type of projector capable of using the projected screen on the screen as a user interface by which input can be made is called an "interactive projector". An object used for giving an instruction to the projected screen is called a "pointing element".

CITATION LIST

Patent Literature

PTL 1: JP-A-2012-150636
PTL 2: JP-T-2008-520034

SUMMARY OF INVENTION

Technical Problem

In a typical interactive projector, it is determined whether the instruction is given by the pointing element or not according to whether the tip of the pointing element is in contact with the screen or not. Contact of the pointing element can be detected based on a distance between the tip of the pointing element and the screen. However, in an interactive projector having a configuration in which a three-dimensional position of the tip of the pointing element is detected using a plurality of cameras, in a case where the screen is a curved surface, detection accuracy of the distance between the pointing element and the screen was not high and detection accuracy of contact of the pointing element was not enough. For that reason, it was desirable to improve the detection accuracy of contact of the pointing element with respect to the curved screen.

Solution to Problem

The invention is intended to solve at least some of the problems described above and can be realized by the following aspects or application examples.

(1) According to an aspect of the invention, there is provided an interactive projector receiving an instruction by a pointing element of a user with respect to a projected screen. The interactive projector includes a projection unit that projects the projected screen on a screen surface, a plurality of cameras including a first camera and a second camera that capture an image of an area of the projected screen, a position detection unit that detects a three-dimensional position of the pointing element with respect to the projected screen based on a plurality of images including the pointing element of which the image is captured by the plurality of cameras, a function calculation unit calculates a curved-surface function representing a three-dimensional shape of the projected screen based on a captured image including a specific image captured by the camera when the specific image is projected by the projection unit, the specific image being used for detecting the position of the projected screen, and a contact detection unit that detects contact of the pointing element with the projected screen using the three-dimensional position of the pointing element detected by the position detection unit and the curved-surface function calculated by the function calculation unit, and the function calculation unit detects three-dimensional positions of a plurality of reference points, which are different from each other, on the projected screen based on the captured image including the specific image and calculates the curved-surface function based on the three-dimensional positions of the plurality of reference points.

In the interactive projector, the curved-surface function representing a three-dimensional shape of the projected screen is calculated based on the plural three-dimensional positions on the projected screen. Detection of contact of the pointing element with the projected screen is calculated using the three-dimensional position of the pointing element and the curved-surface function of the projected screen and thus, it is possible to improve detection accuracy of contact of the pointing element with respect to the curved-surface screen.

(2) In the interactive projector, the function calculation unit may calculate the curved-surface function as a function represented by the equation (1).

$$\sum_{j=1}^{N1} a_j X^j + \sum_{j=1}^{N2} b_j Y^j + \sum_{j=1}^{N3} c_j Z^j + d = 0 \quad (1)$$

(Here, N1, N2, and N3 are zeros or positive integers satisfying $P \geq N1+N2+N3+1$ and at least one of N1, N2, and N3 is a positive integer. P is the number of the reference points. $a_j$, $b_j$, $c_j$, and d are constants, and at least one of $a_j$, $b_j$, and $c_j$ is not zero.)

According to this configuration, it is possible to easily calculate a three-dimensional shape of the projected screen as the curved-surface function based on the three-dimensional position of the reference point on the projected screen.

(3) In the interactive projector, the function calculation unit may calculate the curved-surface function as a function represented by the equation (2).

$$\sum_{j=1}^{N1} a_j X^j + \sum_{j=1}^{N2} b_j Y^j + d = Z \quad (2)$$

(Here, N1 and N2 are zeros or positive integers satisfying $P \geq N1+N2+1$, and at least one of N1 and N2 is a positive integer. P is the number of the reference points. $a_j$, $b_j$, and d are constants, and at least one of $a_j$ and $b_j$ is not zero.)

According to this configuration, similarly, it is possible to easily calculate the three-dimensional shape of the projected screen as the curved-surface function based on the three-dimensional position of the reference point on the projected screen.

(4) In the interactive projector, the function calculation unit may calculate the curved-surface function as a function represented by the equation (3).

$$\sum_{k=1}^{M1} a_k X^{2k} + \sum_{k=1}^{M2} b_k Y^{2k} + \sum_{k=1}^{M3} c_k Z^{2k} + d = 0 \qquad (3)$$

(Here, M1, M2, and M3 are zeros or positive integers satisfying P≥M1+M2+M3+1, and at least one of M1, M2, and M3 is a positive integer. P is the number of the reference points. $a_k$, $b_k$, $c_k$, and d are constants and at least one of $a_k$, $b_k$ and $c_k$ is not zero.)

According to this configuration, it is possible to calculate the three-dimensional shape of the projected screen at higher speed as the curved-surface function, based on the three-dimensional position of the reference point on the projected screen.

(5) In the interactive projector, the function calculation unit may calculate the curved-surface function as a function represented by the equation (4).

$$\sum_{k=1}^{M1} a_k X^{2k} + \sum_{k=1}^{M2} b_k Y^{2k} + d = Z \qquad (4)$$

(Here, M1 and M2 are zeros or positive integers satisfying P≥M1+M2+1, and at least one of M1 and M2 is a positive integer. P is the number of the reference points. $a_k$, $b_k$, and d are constants and at least one of $a_k$ and $b_k$ is not zero.)

According to this configuration, similarly, it is possible to calculate the three-dimensional shape of the projected screen at higher speed as the curved-surface function, based on the three-dimensional position of the reference point on the projected screen.

(6) In the interactive projector, a control unit, which determines the content of an instruction of the user based on the three-dimensional position of the pointing element when the contact detection unit detects contact of the pointing element with the projected screen, may be further included.

According to this configuration, it is possible to improve accuracy of determination of the instruction content of the user who uses the pointing element with respect to the curved-surface screen.

The invention can be realized by various aspects, for example, a system that includes a pointing element including at least one of a self-light emitting pointing element and a non-light-emitting pointing element, a screen, and an interactive projector, a control method and a control device of the interactive projector, and a computer program for realizing functions of the method and device, and a non-transitory storage medium in which the computer program is stored.

BRIEF DESCRIPTION OF DRAWINGS

FIG. 4A illustrates an explanatory diagram for illustrating a situation of operations using a self-light emitting pointing element and a non-light-emitting pointing element.

FIG. 4B illustrates an explanatory diagram for illustrating a situation of operations using a self-light emitting pointing element and a non-light-emitting pointing element.

FIG. 5A illustrates a diagram for illustrating an example of a projected screen on which a pattern image for measurement is displayed.

FIG. 5B illustrates a diagram for illustrating an example of a projected screen on which a pattern image for measurement is displayed.

FIG. 6A illustrates a first diagram in which a pattern image for measurement is projected on a curved-surface screen.

FIG. 6B illustrates a first diagram in which a pattern image for measurement is projected on a curved-surface screen.

FIG. 7A illustrates a second diagram in which a pattern image for measurement is projected on a curved-surface screen.

FIG. 7B illustrates a second diagram in which a pattern image for measurement is projected on a curved-surface screen.

DESCRIPTION OF EMBODIMENTS

A1. Overview of System

Figure 1:
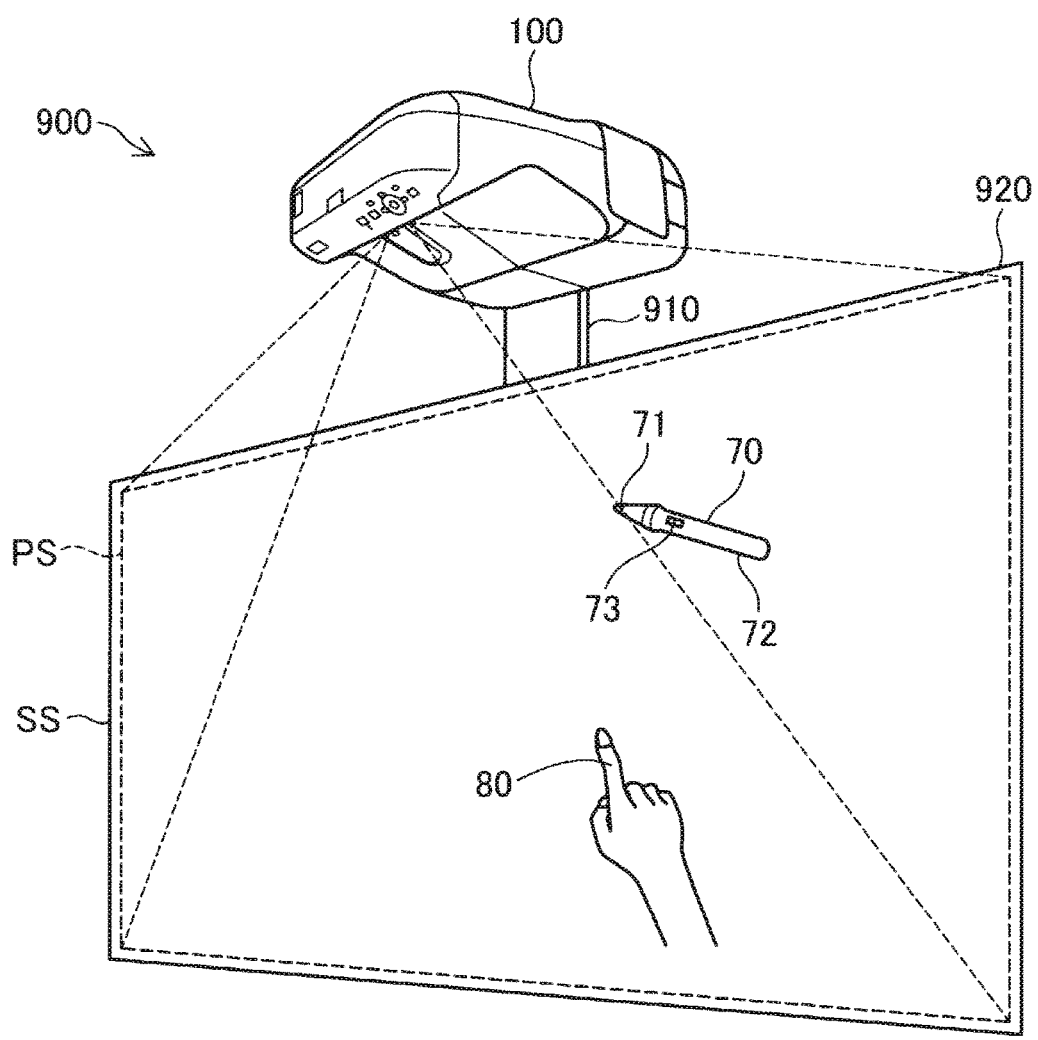
FIG. 1 illustrates a perspective view of an interactive projection system.

FIG. 1 is a perspective view of an interactive projection system 900 according to an embodiment of the invention. The system 900 includes an interactive projector 100, a screen plate 920, and a self-light emitting pointing element 70. A front surface of the screen plate 920 is used as a projection screen surface SS. The projector 100 is fixed to the front and above the screen plate 920 by a support member 910. In FIG. 1, although the projection screen surface SS is arranged vertically, the system 900 in which the projection screen surface SS is arranged horizontally can also be used.

The projector 100 projects a projected screen PS on the projection screen surface SS. The projected screen PS normally includes an image rendered within the projector 100. In a case where the image rendered within the projector 100 is not present, the projected screen PS is irradiated with light from the projector 100 and a white-colored image is displayed on the projected screen PS. In the present specification, a "projection screen surface SS" (or "screen surface SS") means a surface of a member on which an image is projected. The "projected screen PS" means an area of the image projected on the projection screen surface SS by the projector 100. Normally, the projected screen PS is projected on a portion of the projection screen surface SS.

The self-light emitting pointing element 70 is a pen type pointing element including a tip portion 71 capable of emitting light, a shaft portion 72 held by a user, and a button switch 73 provided on the shaft portion 72. A configuration and function of the self-light emitting pointing element 70 will be described later. In the system 900, one or a plurality of self-light emitting pointing elements 70 can be used together with one or a plurality of non-light-emitting pointing elements 80 (non-light-emitting pen, finger, or the like). In the following, in a case where the self-light emitting pointing element 70 and the non-light-emitting pointing element 80 are not distinguished with each other, the elements are also called simply a pointing element 780.

Figure 2A:
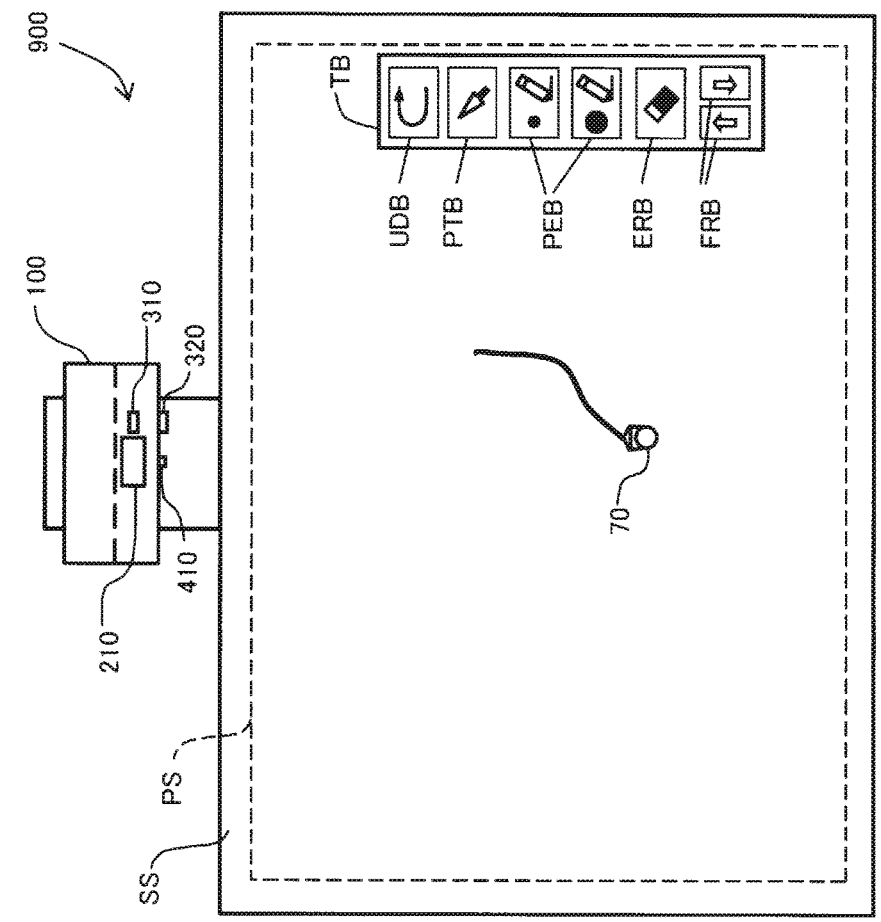
FIG. 2A illustrates a side view of the interactive projection system.
Figure 2B:
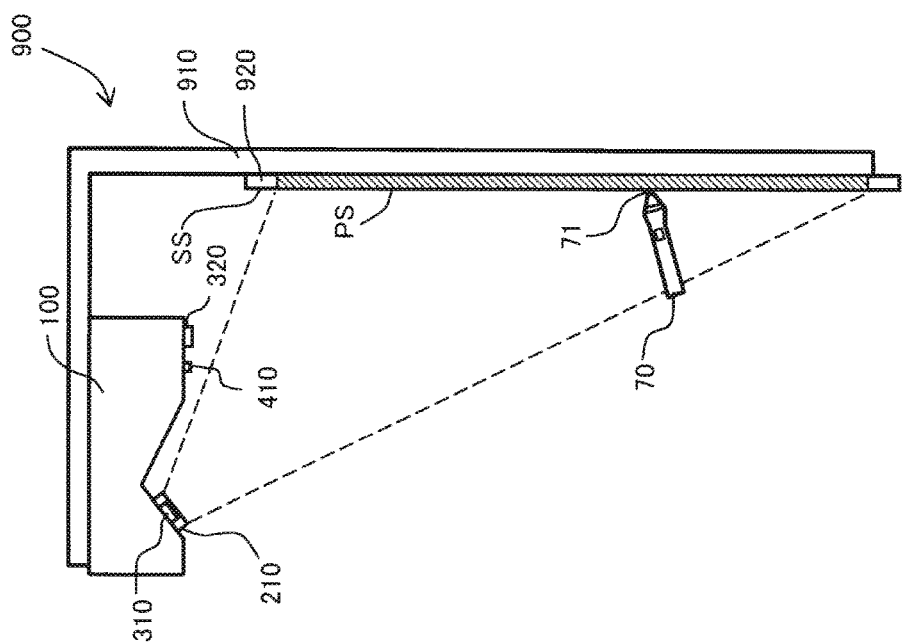
FIG. 2B illustrates a front view of the interactive projection system.

FIG. 2A is a side view of the interactive projection system 900 and FIG. 2B is a front view thereof. In the present specification, a direction along the left and right of the screen surface SS is defined as the X direction, a direction along the up and down of the screen surface SS is defined as the Y direction, and a direction along the normal direction of the screen surface SS is defined as the Z direction. For convenience of explanation, the X direction is also called a "left and right direction", the Y direction is also called an "up and down direction", and the Z direction is also called a "front-and-rear direction". A direction, in which the projected screen PS exists, of the Y direction (up and down direction), when viewed from the projector 100 is called a "down direction". In FIG. 2A, for convenience of illustration, a range of the projected screen PS among the screen plate 920 is hatched.

The projector 100 includes a projection lens 210 projecting the projected screen PS on the screen surface SS, a first camera 310 and a second camera 320 that capture an image of an area of the projected screen PS, and a detection light irradiation unit 410 for illuminating a pointing element 780 with detection light. As detection light, for example, near-infrared light is used. Two cameras 310 and 320 have at least a first image-capturing function of receiving light in a wavelength region which includes a wavelength of detection light and capturing an image. At least one of two cameras 310 and 320 has a second image-capturing function of receiving light including visible light and capturing an image, and the two image-capturing functions are configured to be switchable. It is preferable that for example, a near-infrared filter which shields visible light and transmits only near-infrared light is arranged ahead of a lens in the two cameras 310 and 320 or a near-infrared filter switching mechanism (not illustrated) capable of being retreated from ahead of the lens is provided in each of the two cameras 310 and 320. Positions of two cameras 310 and 320 in the left and right direction (X direction) are the same and two cameras 310 and 320 are arranged by being aligned with a predetermined distance in the front and rear direction (Z direction). Two cameras 310 and 320 are not limited to the present embodiment. For example, positions of two cameras 310 and 320 in the front and rear direction (Z direction) may be the same and two cameras 310 and 320 may be arranged by being aligned with a predetermined distance in the left and right direction (X direction). Also, positions in all of the X, Y, and Z directions may be different from each other. When two cameras are arranged by varying the position in the Z direction (being deviated in the front and rear direction), accuracy of the Z coordinate in calculating a three-dimensional position by triangulation is high and thus, it is a preferable configuration.

In an example of FIG. 2B, a situation in which the interactive projection system 900 operates in a whiteboard mode is illustrated. The whiteboard mode is a mode at which a user is able to arbitrary perform rendering on the projected screen PS using the self-light emitting pointing element 70 or the non-light-emitting pointing element 80. The projected screen PS including a toolbox TB is projected on the screen surface SS. The toolbox TB includes a cancel button UDB for restoring processing, a pointer button PTB for selecting a mouse pointer, a pen button PEB for selecting a pen tool for rendering, an eraser button ERB for selecting an eraser tool to erase a rendered image, and a forward/rearward button FRB for allowing a screen to be advanced to a next screen or returned to a previous screen. The user is able to touch the buttons using the pointing element so as to make it possible to perform processing according to the touched button or select a tool. Immediately after the activation of the system 900, the mouse pointer may be selected as a default tool. In the example of FIG. 2B, a situation is rendered, in which in a state where the tip portion 71 of the self-light emitting pointing element 70 is in contact with the screen surface SS after the user selects the pen tool, the tip portion 71 is moved within the projected screen PS such that a line is being rendered within the projected screen PS. Rendering of the line is performed by a projection image generation unit (which will be described later) inside the projector 100.

The interactive projection system 900 is also operable at a mode other than the whiteboard mode. For example, the system 900 is also operable at a PC interactive mode at which an image of data transferred via a communication line from a personal computer (not illustrated) is displayed on the projected screen PS. In the PC interactive mode, for example, an image of data of spreadsheet software or the like can be displayed and input, preparation, correction, or the like of data becomes possible using various tools or icons displayed within the image.

Figure 3:
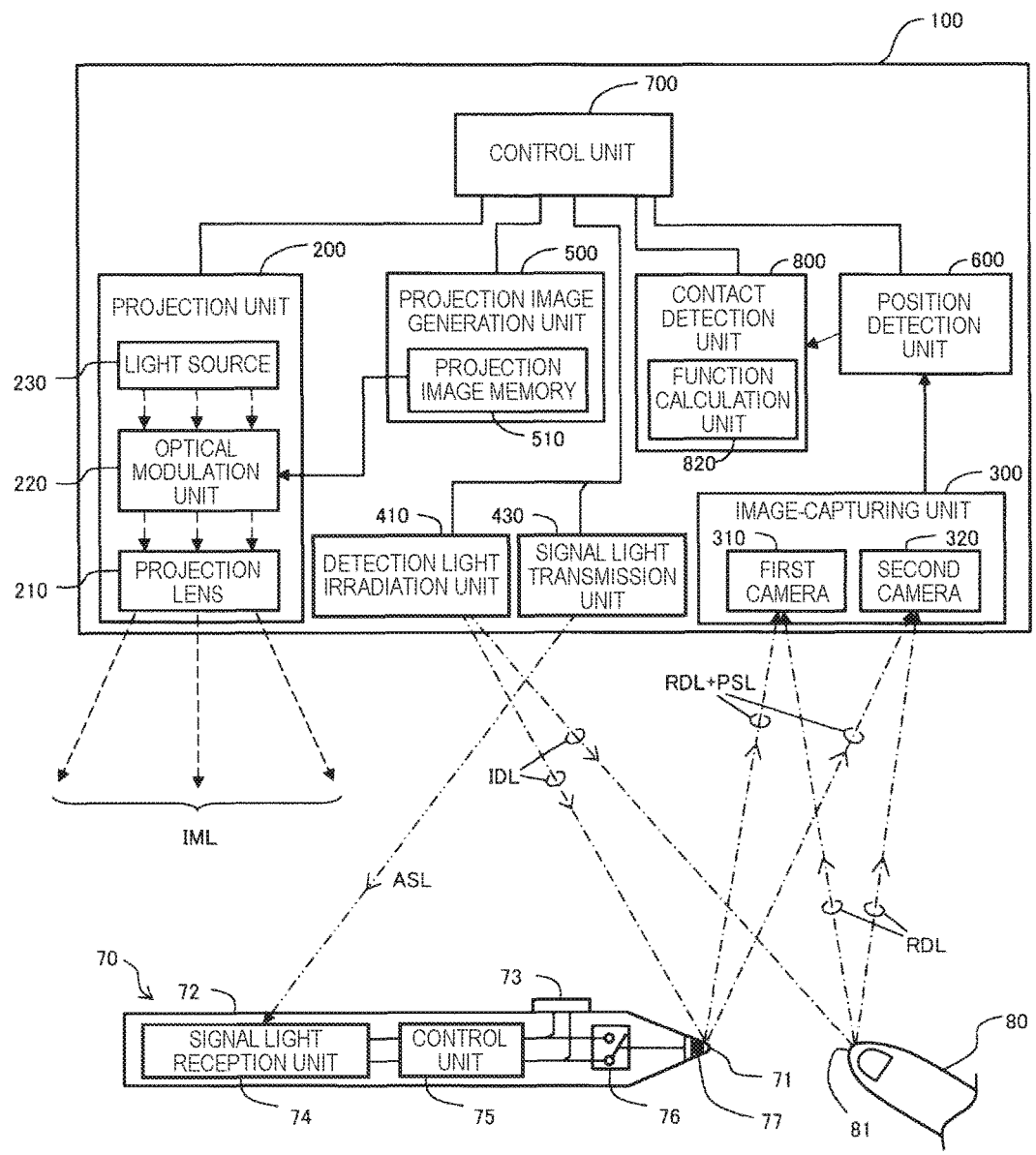
FIG. 3 illustrates a block diagram illustrating internal configurations of the projector and a self-light emitting pointing element.

FIG. 3 is a block diagram illustrating internal configurations of the interactive projector 100 and the self-light emitting pointing element 70. The projector 100 includes a control unit 700, a projection unit 200, a projection image generation unit 500, a position detection unit 600, a contact detection unit 800, an image-capturing unit 300, a detection light irradiation unit 410, and a signal light transmission unit 430.

The control unit 700 controls respective units inside the projector 100. The control unit 700 determines a content of an instruction performed on the projected screen PS by the pointing element 780 based on the three-dimensional position of the pointing element 780 detected by the position detection unit 600 and contact detection of the pointing element 780 by the contact detection unit 800, and instructs the projection image generation unit 500 to prepare or change the projected image according to the content of the instruction.

The projection image generation unit 500 includes a projection image memory 510 storing the projected image and has a function of generating the projected image projected on the screen surface SS by the projection unit 200. Also, the projection image generation unit 500 preferably has a function as a keystone correction unit correcting a trapezoidal distortion of the projected screen PS (FIG. 2B).

The projection unit 200 has a function of projecting the projected image generated by the projection image generation unit 500 on the screen surface SS. The projection unit 200 includes an optical modulation unit 220 and a light source 230, in addition to the projection lens 210 described in FIG. 2. The optical modulation unit 220 modulates light from the light source 230 according to projected image data, which is given from the projection image memory 510, to form projection image light IML. Projection image light IML is typically color image light including visible light of three colors of RGB and is projected on the screen surface SS by the projection lens 210. As the light source 230, various light sources such as a light emitting diode or a laser diode may be adopted, in addition to a light source lamp such as an ultra-high pressure mercury lamp. A transmission type or reflection type liquid crystal panel or a digital mirror device may be adopted as the optical modulation unit 220, and the optical modulation unit 220 may be configured to include a plurality of modulation units 220 for each color light.

The detection light irradiation unit 410 irradiates the screen surface SS and a portion across space in front thereof with irradiation detection light IDL for detecting the tip portion of the pointing element 780. As irradiation detection light IDL, for example, near-infrared light is used. The detection light irradiation unit 410 is turned on only at a period which includes image-capturing timings of the cameras 310 and 320 and turned off at other periods. Otherwise, the detection light irradiation unit 410 may be maintained always in a state of being turned on during operation of the system 900.

The signal light transmission unit 430 has a function of transmitting apparatus signal light ASL which is a synchronizing near-infrared light signal. Apparatus signal light ASL is a synchronizing near-infrared light signal and when the projector 100 is started, the signal light transmission unit 430 regularly emits apparatus signal light ASL to the self-light emitting pointing element 70. A tip light-emitting portion 77 of the self-light emitting pointing element 70 emits pointing element signal light PSL (will be described later in detail), which is near-infrared light having a predetermined light emitting pattern (light-emitting sequence), in synchronization with apparatus signal light ASL. When position detection of the pointing element 780 is performed, the cameras 310 and 320 of the image-capturing unit 300 execute image-capturing at a predetermined timing synchronized with apparatus signal light ASL.

The image-capturing unit 300 includes the first camera 310 and the second camera 320 described in FIG. 2. As previously described, two cameras 310 and 320 have a function of receiving light in a wavelength region, which includes the wavelength of detection light, and capturing an image. In an example of FIG. 3, a situation in which irradiation detection light IDL irradiated by detection light irradiation unit 410 is reflected by the pointing element 780 and reflection detection light RDL is received and captured by two cameras 310 and 320 is rendered. Two cameras 310 and 320 also receive pointing element signal light PSL which is near-infrared light and emitted from the tip light-emitting portion 77 of the self-light emitting pointing element 70 and capture an image thereof. Image-capturing of two cameras 310 and 320 is executed at both of a first period during which irradiation detection light IDL emitted from the detection light irradiation unit 410 is in an on state (light-emitting state) and a second period during which irradiation detection light IDL is in an off state (non-light-emitting state). The position detection unit 600 compares images in the two kinds of periods to thereby make it possible to determine whether individual pointing elements included in the images are the self-light emitting pointing element 70 or non-light-emitting pointing element 80.

At least one of two cameras 310 and 320 has a function of capturing an image using light, which includes visible light, in addition to function of capturing an image using light, which includes near-infrared light. Then, an image of the projected screen PS projected on the screen surface SS is captured by the camera to make it possible for a function calculation unit 820 to calculate a three-dimensional curved-surface function of the projected screen PS using the image as will be described later. The projection image generation unit 500 can execute keystone correction. Since a method of the keystone correction using one or more cameras is well known, description thereof will be omitted here.

The position detection unit 600 has a function of analyzing the image (in the following, also called a "captured image") captured by two cameras 310 and 320 to calculate a three-dimensional position coordinate of the tip portion of the pointing element 780 (self-light emitting pointing element 70 or non-light-emitting pointing element 80) by triangulation principle using parallax between two cameras. In this case, the position detection unit 600 compares the captured images in the first period and the second period described above so as to determine whether an individual pointing element 780 included in the images is one of the self-light emitting pointing element 70 and the non-light-emitting pointing element 80 (which will be described later). It is preferable that a coordinate system of the three-dimensional coordinates to be detected by the position detection unit 600 is a coordinate system (camera coordinate system) of the camera having a function of capturing an image using light including visible light, among the cameras 310 and 320. It is preferable that as an original point of the coordinate system, the original point, which is set on the screen surface SS by the function calculation unit 820 which will be described later when the projector 100 is started, is used.

The contact detection unit 800 detects contact of the pointing element 780 (self-light emitting pointing element 70 and non-light-emitting pointing element 80) with the projected screen PS (screen surface SS). The contact detection unit 800 of the present embodiment executes detection of contact of the self-light emitting pointing element 70 with the projected screen PS based on the light emitting pattern of pointing element signal light PSL emitted by the self-light emitting pointing element 70 and executes detection of contact of the non-light-emitting pointing element 80 with the projected screen PS based on the three-dimensional position coordinate detected by the position detection unit 600. However, the contact detection unit 800 may execute detection of contact of the self-light emitting pointing element 70 with the projected screen PS by the same method as the method for detection of contact of the non-light-emitting pointing element 80 with the projected screen PS.

The contact detection unit 800 of the present embodiment includes the function calculation unit 820 calculating the curved-surface function which represents the three-dimensional shape of the projected screen PS (screen surface SS). The contact detection unit 800 executes detection of contact of the non-light-emitting pointing element 80 with the projected screen PS based on the three-dimensional position coordinates of the non-light-emitting pointing element 80 detected by the position detection unit 600 and the curved-surface function of the projected screen PS calculated by the function calculation unit 820. Specifically, the contact detection unit 800 calculates the distance between the non-light-emitting pointing element 80 and the projected screen PS from the three-dimensional position coordinates of the non-light-emitting pointing element 80 and the curved-surface function of the projected screen PS, and determines that the non-light-emitting pointing element 80 is in contact with the projected screen PS when the distance between the non-light-emitting pointing element 80 and the projected screen PS becomes zero or less than or equal to the error tolerance which is close to zero. Description on the method for detection of contact of the non-light-emitting pointing element 80 by the contact detection unit 800 and the calculation method of the curved-surface function by the function calculation unit 820 will be described later in detail.

The self-light emitting pointing element 70 is provided with a signal light reception unit 74, a control unit 75, a tip switch 76, and a tip light-emitting portion 77, in addition to a button switch 73. The signal light reception unit 74 has a function of receiving apparatus signal light ASL emitted from the signal light transmission unit 430 of the projector 100. The tip switch 76 is a switch which becomes an on state when the tip portion 71 of the self-light emitting pointing element 70 is pushed and becomes an off state when the tip portion 71 is released. The tip switch 76 is normally in the off state and becomes the on state by a contact pressure when the tip portion 71 of the self-light emitting pointing element 70 contacts with the screen surface SS. When the tip switch 76 is in the off state, the control unit 75 causes the tip light-emitting portion 77 to emit light in a specific first light emitting pattern, which indicates that the tip switch 76 is in the off state, so as to emit pointing element signal light PSL having the first light emitting pattern. On the other hand, when the tip switch 76 is in the on state, the control unit 75 causes the tip light-emitting portion 77 to emit light in a specific second light emitting pattern, which indicates that the tip switch 76 is in the on state, so as to emit pointing element signal light PSL having the second light emitting pattern. The first light emitting pattern and the second light emitting pattern are different from each other and thus, the position detection unit 600 is able to identify whether the tip switch 76 is in the on state or off state by analyzing the images captured by two cameras 310 and 320. The contact detection unit 800 can detect contact of the self-light emitting pointing element 70 with the projected screen PS based on an analysis result of the position detection unit 600.

The button switch 73 of the self-light emitting pointing element 70 has the same function as that of the tip switch 76. Accordingly, the control unit 75 causes the tip light-emitting portion 77 to emit light in the second light emitting pattern in a state where the button switch 73 is pushed by the user and causes the tip light-emitting portion 77 to emit light in the first light emitting pattern in a state where the button switch 73 is not pushed by the user. In other words, the control unit 75 causes the tip light-emitting portion 77 to emit light in the second light emitting pattern in a state where at least one of the tip switch 76 and the button switch 73 is in the on state and causes the tip light-emitting portion 77 to emit light in the first light emitting pattern in a state where both of the tip switch 76 and the button switch 73 are in the off state.

However, the button switch 73 may be assigned a function different from the tip switch 76. For example, in a case where the button switch 73 is assigned the same function as the right click button of a mouse, when the user pushes the button switch 73, a right click instruction is delivered to the control unit 700 of the projector 100 and processing according to the instruction is executed. As such, in a case where the button switch 73 is assigned the function different from the tip switch 76, the tip light-emitting portion 77 emits light in four light emitting patterns which are different from each other according to the on/off state of the tip switch 76 and the on/off state of the button switch 73. In this case, the self-light emitting pointing element 70 is able to deliver the instruction to the projector 100 while distinguishing four combinations of the on/off states of the tip switch 76 and the button switch 73.

FIG. 4 are explanatory diagrams illustrating a situation of an operation performed using the self-light emitting pointing element 70 and the non-light-emitting pointing element 80. In this example, both the tip portion 71 of the self-light emitting pointing element 70 and the tip portion 81 of the non-light-emitting pointing element 80 are separated from the screen surface SS. The XY coordinates $(X_{71}, Y_{71})$ of the tip portion 71 of the self-light emitting pointing element 70 are on an eraser button ERB of a toolbox TB. Here, a mouse pointer PT is selected as a tool representing a function of the tip portion 71 of the self-light emitting pointing element 70 and the mouse pointer PT is rendered on the projected screen PS such that the tip $OP_{71}$ of the mouse pointer PT is present on the eraser button ERB. As previously described, the three-dimensional position of the tip portion 71 of the self-light emitting pointing element 70 is determined by triangulation using the images captured by two cameras 310 and 320. Accordingly, the mouse pointer PT is rendered on the projected screen PS in such a way that the operation point $OP_{71}$ present in the tip of the mouse pointer PT is arranged on the position of the XY coordinates $(X_{71}, Y_{71})$ among the three-dimensional position coordinates $(X_{71}, Y_{71}, Z_{71})$ of the tip portion 71 determined by triangulation. That is, the tip $OP_{71}$ of the mouse pointer PT is arranged on the XY coordinates $(X_{71}, Y_{71})$ among the three-dimensional position coordinates $(X_{71}, Y_{71}, Z_{71})$ of the tip portion 71 of the self-light emitting pointing element 70 and an instruction of the user is performed at the position. For example, in this state, the user is able to select the eraser tool by causing the tip portion 71 of the self-light emitting pointing element 70 to be brought into contact with the projected screen PS. In this state, the user is also able to select the eraser tool by pushing the button switch 73 of the self-light emitting pointing element 70. As such, in the present embodiment, also, in a case where the self-light emitting pointing element 70 is in a state of being separated from the screen surface SS, the button switch 73 is pushed so as to make it possible to give an instruction to the projector 100 according to the content of the projected screen PS in the operation point $OP_{71}$ arranged on the XY coordinates $(X_{71}, Y_{71})$ of the tip portion 71.

In FIG. 4B, a pen tool PE is selected as a tool representing a function of the tip portion 81 of the non-light-emitting pointing element 80 and the pen tool PE is rendered on the projected screen PS. As previously described, the three-dimensional position of the tip portion 81 of the non-light-emitting pointing element 80 is also determined by triangulation using the images captured by two cameras 310 and 320. Accordingly, the pen tool PE is rendered on the projected screen PS in such a way that the operation point $OP_{81}$ present in the tip of the pen tool PE is arranged on the position of the XY coordinates $(X_{81}, Y_{81})$ among the three-dimensional position coordinates $(X_{81}, Y_{81}, Z_{81})$ of the tip portion 81 determined by triangulation. However, when the user gives an instruction to the projector 100 using the non-light-emitting pointing element 80, the instruction (rendering, tool selection, or the like) is performed in a state where the tip portion 81 of the non-light-emitting pointing element 80 is in contact with the projected screen PS.

In the example of FIG. 4, also in a case where the tip portion of the pointing element 780 (light-emitting pointing element 70 and non-light-emitting pointing element 80) is separated from the projected screen PS, a tool (mouse pointer PT or pen tool PE) selected by an individual pointing element is rendered and displayed on the projected screen PS. Accordingly, also, in a case where the user does not put the tip portion of the pointing element in contact with the projected screen PS, there is an advantage that it is easy to understand which tool is selected by the pointing element and the operation is easy. The tool is rendered in such a way that an operation point OP of the tool is arranged at the position of the XY coordinates among the three-dimensional position coordinates of the tip portion of the pointing element and thus, there is an advantage that the user is able to suitably recognize a position of a tool being used.

The interactive projection system 900 is configured to simultaneously use a plurality of self-light emitting pointing elements 70. In this case, the light emitting patterns of the pointing element signal light PSL described above are preferably unique light emitting patterns capable of identifying a plurality of self-light emitting pointing elements 70. More specifically, in a case where it is possible to simultaneously use N (N is an integer of 2 or more) self-light emitting pointing elements 70, the light emitting patterns of pointing element signal light PSL are preferably capable of distinguishing N self-light emitting pointing elements 70. In a case where a plurality of unit light emitting periods are included in a set of light emitting patterns, it is possible to represent two values of light emission and non-light emission in one unit light emitting period. Here, one unit light emitting period corresponds to a period during which the tip light-emitting portion 77 of the self-light emitting pointing element 70 represents 1-bit information of on/off. In a case where a set of light emitting patterns are constituted with M (M is an integer of 2 or more) unit light emitting periods, $2^M$ states can be distinguished by a set of light emitting patterns. Accordingly, it is preferable that the number M of unit light emitting periods constituting a set of light emitting patterns M is set to satisfy the following equation (5).

$$N \times Q \leq 2^M: \quad (5)$$

Here, Q is the number of states distinguished by the switches 73 and 76 of the self-light emitting pointing element 70, in an example of the present embodiment, Q=2 or Q=4. For example, in a case of Q=4, it is preferable that when N is set as N=2, M is set as an integer of 3 or more, and when N is set as N=3 or 4, M is set as an integer of 4 or more. In this case, the position detection unit 600 (or control unit 700) executes identification using M images respectively captured by the cameras 310 and 320 in M unit light emitting periods of a set of light emitting patterns when identifying N self-light emitting pointing elements 70 and states of the switches 73 and 76 of each self-light emitting pointing element 70. The light emitting pattern of the M-bit is a pattern obtained by setting the pointing element signal light PSL to on or off in a state where irradiation detection light IDL is maintained in the off state, and the non-light-emitting pointing element 80 is not photographed in images captured by the cameras 310 and 320. It is preferable to further add a unit light emitting period of 1-bit, in which irradiation detection light IDL is set to the on state, in order to capture the image used for detecting the position of the non-light-emitting pointing element 80. However, the pointing element signal light PSL may be either of the on/off in the unit light emitting period for position detection. The image obtained in the unit light emitting period for position detection can also be used for position detection of the self-light emitting pointing element 70.

Specific examples of five kinds of signal light rendered in FIG. 3 are summarized as follows.

(1) Projection image light IML: It is image light (visible light) projected on the screen surface SS by the projection lens 210 in order to project the projected screen PS on the screen surface SS.

(2) Irradiation detection light IDL: It is near-infrared light with which the screen surface SS and space ahead of the screen surface SS are irradiated by the detection light irradiation unit 410 in order to detect the tip portion of the pointing element 780 (self-light emitting pointing element 70 and non-light-emitting pointing element 80).

(3) Reflection detection light RDL: It is near-infrared light reflected by the pointing element 780 (self-light emitting pointing element 70 and non-light-emitting pointing element 80) and received by two cameras 310 and 320, among near-infrared light irradiated as irradiation detection light IDL.

(4) Apparatus signal light ASL: It is near-infrared light regularly emitted from the signal light transmission unit 430 of the projector 100 in order to synchronize the projector 100 with the self-light emitting pointing element 70.

(5) Pointing element signal light PSL: It is near-infrared light emitted from the tip light-emitting portion 77 of the self-light emitting pointing element 70 at the timing synchronized with apparatus signal light ASL. The light emitting patterns of pointing element signal light PSL are changed according to the on/off state of the switches 73 and 76 of the self-light emitting pointing element 70. The light emitting patterns also include unique light emitting patterns for identifying the plurality of self-light emitting pointing elements 70.

In the present embodiment, position detection of the tip portions of the self-light emitting pointing element 70 and the non-light-emitting pointing element 80 and determination of the content instructed by the self-light emitting pointing element 70 and the non-light-emitting pointing element 80 are respectively executed as follows.

A2. Overview of Position Detection Method and Determination Method of Instruction Content of Self-Light Emitting Pointing Element 70

The three-dimensional position coordinates ($X_{71}$, $Y_{71}$, $Z_{71}$) of the tip portion 71 of the self-light emitting pointing element 70 are determined according to triangulation using the images captured by two cameras 310 and 320, by the position detection unit 600. In this case, whether it is the self-light emitting pointing element 70 or not can be recognized by determining whether the light emitting pattern of the tip light-emitting portion 77 appears on the images captured at a plurality of predetermined timings or not. Also, whether the tip portion 71 of the self-light emitting pointing element 70 is in contact with the screen surface SS or not (that is, whether the tip switch 76 is in an on state or not) can be determined by using the light emitting patterns of the tip light-emitting portion 77 in the images captured at the plurality of timings. By the position detection unit 600 and the contact detection unit 800, the three-dimensional position of the tip portion 71 of the self-light emitting pointing element 70 can be detected and contact of the tip portion 71 with the screen surface SS can be detected. The control unit 700 determines the content of the instruction given by the self-light emitting pointing element 70 based on the detection results of the position detection unit 600 and the contact detection unit 800, causes the projection image generation unit 500 to generate an image according to the instruction content, and causes the projection unit 200 to project the image according to the instruction content on the screen surface SS. For example, as exemplified in FIG. 4B, in a state where the position of the XY coordinates ($X_{71}$, $Y_{71}$) of the tip portion 71 is present on any of the buttons within the toolbox TB, in a case where the tip switch 76 is in an on state, a tool of the button is selected. As exemplified in FIG. 2B, in a state where the XY coordinates ($X_{71}$, $Y_{71}$) of the tip portion 71 are present at a position other than the toolbox TB within the projected screen PS, in a case where the tip switch 76 is in an on state, processing by the selected tool (for example, rendering) is selected. The control unit 700 causes the projection image generation unit 500 to render a preselected pointer or a mark, using the XY coordinates ($X_{71}$, $Y_{71}$) of the tip portion 71 of the self-light emitting pointing element 70, such that the pointer or the mark is arranged at the positions ($X_{71}$, $Y_{71}$) within the projected screen PS. The control unit 700 executes processing according to the content instructed by the self-light emitting pointing element 70 and causes the projection image generation unit 500 to render an image including the processing result.

A3. Overview of Position Detection Method and Determination Method of Instruction Content of Non-Light-Emitting Pointing Element 80

The three-dimensional position coordinates ($X_{81}$, $Y_{81}$, $Z_{81}$) of the tip portion 81 of the non-light-emitting pointing element 80 are also determined according to triangulation using the images captured by two cameras 310 and 320. In this case, whether it is the non-light-emitting pointing element 80 or not can be recognized by determining whether the light emitting pattern of the self-light emitting pointing element 70 appears on the images captured at a plurality of predetermined timings or not. In two images captured by two cameras 310 and 320, the position of the tip portion 81 of the non-light-emitting pointing element 80 can be determined by using a well known art such as a template matching or a feature extraction method. For example, in a case where the tip portion 81 of the non-light-emitting pointing element 80 which is the finger is recognized by template matching, a plurality of templates relating to the finger are prepared and the tip portion 81 of the finger can be recognized by retrieving a portion suitable for the templates in the image captured by two cameras 310 and 320. Regarding whether the tip portion 81 of the non-light-emitting pointing elements 80 is in contact with the screen surface SS or not, the contact detection unit 800 determines according to whether a difference between a Z coordinate value of the tip portion 81 determined using triangulation by the position detection unit 600 and a Z coordinate value of the screen surface SS calculated from the curved-surface function of the projected screen PS is equal to or less than a minute tolerance or not, that is, according to whether the tip portion 81 is sufficiently near the surface of the screen surface SS or not. As the tolerance, a small value of approximately 2 mm to 6 mm is preferably used. In a case where the contact detection unit 800 determines that the tip portion 81 of the non-light-emitting pointing elements 80 is in contact with the screen surface SS, the control unit 700 determines the instruction content according to the content of the projection screen surface SS at the contact position. The control unit 700 may cause the projection image generation unit 500 to render a preselected pointer or a mark, using the XY coordinates ($X_{81}$, $Y_{81}$) of the tip of the non-light-emitting pointing element 80 detected by the position detection unit 600, such that the pointer or the mark is arranged at the positions ($X_{81}$, $Y_{81}$) within the projected screen PS. The control unit 700 may execute processing according to the content instructed by the non-light-emitting pointing element 80 and may cause the projection image generation unit 500 to render an image including the processing result.

A4. (First) Calculation of Curved-Surface Function of Projected Screen PS

FIG. 5 are diagrams for illustrating an example of the projected screen PS on which a pattern image for measurement CPM which is used for calculating the curved-surface function of the projected screen PS is displayed. The function calculation unit 820 is able to calculate a three-dimensional curved-surface function of the projected screen PS by the following methods. First, when the projector 100 is started, the projection unit 200 projects the projected screen PS on which the pattern image for measurement CPM (calibration pattern image) is displayed on the projection screen surface SS. The pattern image for measurement CPM is an image including a plurality of reference points Pc and is stored in a storing unit (not illustrated) as pattern image data for measurement in advance. In the present embodiment, 25 reference points Pc (Pc1 to Pc25) are arranged in the pattern image for measurement CPM such that 5 reference points are arranged side by side in each row and 5 reference points are arranged one behind the other in each column. The number P of the reference points Pc included in the pattern image for measurement CPM is not limited to the number described above, as long as P≥3 is satisfied. However, it is preferable that the reference points Pc are regularly arranged in a matrix form within the pattern image for measurement CPM. The reference points Pc are not limited to points (dots), but may include intersections of two straight lines or corner portions of a rectangle, as long as a configuration in which a specific position on the projected screen PS can be identified is adopted.

When the projected screen PS on which the pattern image for measurement CPM is displayed is projected on the projected screen surface SS, the image-capturing unit 300 photographs an area including the projected screen PS on which the pattern image for measurement CPM is displayed by the camera having the second image-capturing function (function of receiving light including visible light and capturing an image) among the first camera 310 and the second camera 320. With this, a captured image CI including the pattern image for measurement CPM is obtained. The function calculation unit 820 analyzes the obtained captured image CI, detects the position of each reference point Pc in the captured image CI, and detects the three-dimensional position coordinates of each reference point Pc from the detected position. It is preferable that a coordinate system of the three-dimensional coordinates to be detected by the function calculation unit 820 is the same as the camera coordinate system when the position detection unit 600 detects the three-dimensional position coordinates of the pointing element 780. The three-dimensional position coordinates of the reference point Pc may be detected using parallax between the projection unit 200 and the image-capturing unit 300 (camera which performed photography), by using an active stereo method for detecting three-dimensional position coordinates by triangulation principle. A method (for example, s passive stereo method using two cameras) other than the active stereo method may be used in detecting the three-dimensional position coordinates of the reference point Pc. With this, it is possible to obtain three-dimensional position coordinates Pc1 ($X_{c1}$, $Y_{c1}$, $Z_{c1}$), Pc2 ($X_{c2}$, $Y_{c2}$, $Z_{c2}$), Pc3 ($X_{c3}$, $Y_{c3}$, $Z_{c3}$), . . . , Pc25 ($X_{c25}$, $Y_{c25}$, $Z_{c25}$) of respective reference points Pc1 to Pc25. It is preferable that the function calculation unit 820 calculates the three-dimensional position coordinates of other reference points Pc by using any one of the reference points Pc1 to Pc25 as the original point of the coordinate system, and is more preferable that the reference point Pc13 positioned at the center of the projected screen PS, among the reference points Pc1 to Pc25, is used as the original point of the coordinate system.

The function calculation unit 820 calculates the curved-surface function representing an approximate curved surface of the projected screen PS based on the detected three-dimensional position coordinates of respective reference points Pc. The function calculation unit 820 of the present embodiment preferably calculates the curved-surface function by using the following equation (1) as a fitting function.

$$\sum_{j=1}^{N1} a_j X^j + \sum_{j=1}^{N2} b_j Y^j + \sum_{j=1}^{N3} c_j Z^j + d = 0 \quad (1)$$

Here, N1, N2, and N3 are zeros or positive integers satisfying P≥N1+N2+N3+1 and at least one of N1, N2, and N3 is a positive integer. P is the number of the reference points Pc. $a_j$, $b_j$, and $c_j$, and d are constants, and at least one of $a_j$, $b_j$, and $c_j$ is not zero.

According to the present embodiment, the three-dimensional shape of the projected screen PS is approximated to a curved-surface function including the X of N1st order, the Y of N2nd order, and the Z of N3rd order. N1, N2, and N3 are set to satisfy P≥N1+N2+N3+1 to thereby make it possible to the number P of reference points Pc to be greater than or equal to the number (N1+N2+N3+1) of unknown quantities included in the equation (1) and to calculate values (including approximate solutions) of these unknown quantities. As is evident from the equation (1) described above, the three-dimensional curved-surface function of the projected screen PS includes a three-dimensional plane function (for example, when all of N1, N2, and N3 are 1). In a case where a plurality of types of the pattern images for measurement CPM to be projected by the projection unit 200 are present, the function calculation unit 820 may set N1, N2, and N3 according to the number P of reference point Pc included in respective pattern images for measurement CPM.

Here, description will be made on an example of a case where the number P of reference points Pc included in the pattern image for measurement CPM is set to 25 and respective N1, N2, and N3 of the equation (1) are set to 4. 25 simultaneous equations like the following equation (6) are established from the equation (1) and the three-dimensional position coordinates of 25 reference points Pc1 to Pc25. The number of unknown quantities is 13 of a1 to a4, b1 to b4, and c1 to c4, and d and thus, the equation (6) becomes simultaneous equations of excessive conditions. In this case, for example, an approximate solution can be calculated by a least square method. An approximate solution calculation method by the least square method is well known and thus, description thereof will be omitted here. The curved-surface function of the projected screen PS can be calculated by calculating the value of unknown quantities.

$$\begin{cases} \sum_{j=1}^{4} (a_j X_{c1}^j + b_j Y_{c1}^j + c_j Z_{c1}^j) + d = 0 \\ \vdots \\ \sum_{j=1}^{4} (a_j X_{c25}^j + b_j Y_{c25}^j + c_j Z_{c25}^j) + d = 0 \end{cases} \quad (6)$$

A5. Detection of Contact of Projected Screen PS with Non-Light-Emitting Pointing Element 80

The contact detection unit 800 substitutes the XY coordinates $(X_{81}, Y_{81})$ among the three-dimensional position coordinates $(X_{81}, Y_{81}, Z_{81})$ of the tip portion 81 of the non-light-emitting pointing element 80 calculated by the position detection unit 600 into the curved-surface function of the projected screen PS calculated by the function calculation unit 820 to thereby make it possible to calculate the Z coordinate on the screen surface SS when the tip portion 81 of the non-light-emitting pointing element 80 is projected in the Z direction. It is possible to set a difference between the Z coordinate of the tip portion 81 of the non-light-emitting pointing element 80 and the Z coordinate on the screen surface SS as a distance between the non-light-emitting pointing element 80 and the projection screen surface SS. When the distance is less than or equal to tolerance, it is possible to detect contact of the non-light-emitting pointing element 80 with the projection screen surface SS.

FIG. 6 and FIG. 7 are diagrams in which the pattern image for measurement CPM is projected on a curved-surface screen. A screen surface SS1 of FIG. 6 is formed with a surface which is curved inwardly in the left and right direction and a screen surface SS2 of FIG. 7 is formed with a surface which is curved inwardly in the up and down direction. According to the present embodiment, since the function calculation unit 820 approximates the three-dimensional shape of the projected screen PS to the curved-surface function like the equation (1), even when the screen surface is a curved surface, it is possible to reduce an error between the function representing the three-dimensional shape of the projected screen PS and a shape of the actual screen surface. With this, it is possible to achieve improvement in detection accuracy of contact of the non-light-emitting pointing element 80 with the projection screen surface SS.

B. (Second) Calculation of Curved-Surface Function of Projected Screen PS

The function calculation unit 820 may calculate a mapping function which maps the Z coordinates of respective three-dimensional position coordinates Pc1 $(X_{c1}, Y_{c1}, Z_{c1})$, Pc2 $(X_{c2}, Y_{c2}, Z_{c2})$, Pc3 $(X_{c3}, Y_{c3}, Z_{c3})$, . . . , Pc25 $(X_{c25}, Y_{c25}, Z_{c25})$ of respective reference points Pc1 to Pc25 to a coordinate system in which all Z coordinates become Z=0, based on the detected three-dimensional position coordinates of respective reference points Pc. The three-dimensional position coordinates of the tip portion 81 of the non-light-emitting pointing element 80 detected by the position detection unit 600 are transformed by the mapping function to thereby allow the Z coordinate among the three-dimensional position coordinates after being transformed to be set as the distance between the tip portion 81 and the projection screen surface SS. That is, in a case where the Z coordinate of the tip portion 81 of the non-light-emitting pointing element 80 after being transformed is less than or equal to the tolerance, the contact detection unit 800 may determine that the non-light-emitting pointing element 80 is in contact with the projection screen surface SS.

For example, the function calculation unit 820 may calculate the curved-surface function representing the approximate curved surface of the projected screen PS by using the following equation (2) as the fitting function.

$$\sum_{j=1}^{N1} a_j X^j + \sum_{j=1}^{N2} b_j Y^j + d = Z \qquad (2)$$

Here, N1 and N2 are zeros or positive integers satisfying P≥N1+N2+1, and at least one of N1 and N2 is a positive integer. $a_j$, $b_j$, and d are constants, and at least one of $a_j$ and $b_j$ is not zero.

In this case, with respect to the three-dimensional position coordinates $(X_{81}, Y_{81}, Z_{81})$ of the tip portion 81 of the non-light-emitting pointing element 80, the three-dimensional position coordinates $(X_{81}, Y_{81}, Z_{81}-Z_c)$ correspond to the three-dimensional position coordinates of the tip portion 81 of the non-light-emitting pointing element 80 after being transformed, which is transformed by the mapping function. The Z coordinate $(Z_{81}-Z_c)$ after being transformed corresponds to the distance between the tip portion 81 of the non-light-emitting pointing element 80 and the projected screen PS (the projection screen surface SS) and contact of the tip portion 81 of the non-light-emitting pointing element 80 with the projected screen PS may be detected when the Z coordinate $(Z_{81}-Z_c)$ is less than or equal to a predetermined value which is close to zero. According to this configuration, a term of the Z coordinate of the equation (2) includes only the first order term of which the coefficient is 1 and thus, it is possible to make the number of unknown quantities (N1+N2+1) smaller than the number of unknown quantities (N1+N2+N3+1) of the equation (1). With this, it is possible to achieve reduction of a time required for calculation of the curved-surface function and reduction of processing load required for calculation.

C. (Third) Calculation of Curved-Surface Function of Projected Screen PS

The function calculation unit 820 may use the following equation (3) as the fitting function, in addition to the equation (1) described above.

$$\sum_{k=1}^{M1} a_k X^{2k} + \sum_{k=1}^{M2} b_k Y^{2k} + \sum_{k=1}^{M3} c_k Z^{2k} + d = 0 \qquad (3)$$

Here, M1, M2, and M3 are zeros or positive integers satisfying P≥M1+M2+M3+1, and at least one of M1, M2, and M3 is a positive integer. $a_k$, $b_k$, $c_k$, and d are constants and at least one of $a_k$, $b_k$, and $c_k$ is not zero.

According to this configuration, the three-dimensional shape of the projected screen PS is approximated to the curved-surface function having only terms of which order is an even-number. The equation (3) does not include terms of which order is an odd-number compared to the equation (1) and thus, it is possible to make the number of unknown quantities small in a function having the same order. With this, it is possible to achieve reduction of a time and reduction of processing load required for calculation of the curved-surface function. Fitting into a curved-surface function having order higher than that of the equation (1) can be made using the same processing amount and thus, it is possible to approximate a function to a more actual shape of the screen surface SS. As illustrated in FIG. 6 and FIG. 7, a screen surface of which both side surfaces are curved inwardly and a screen surface of which the upper end and lower end portions are curved inwardly may be used as an actual screen surface. This is for suppressing reflection to the screen surface and making it easier to view an image in the vicinity of both side surfaces or the vicinity of the upper end and lower end portions of the screen surface. A function having only terms of even-number order like the equation (3) is preferably used as the curved-surface function of such a screen surface. In this case, the original point of the coordinate system is preferably set to the center of the projected screen PS.

D. (Fourth) Calculation of Curved-Surface Function of Projected Screen PS

Similar to the relationship between the equation (1) and the equation (2), the function calculation unit 820 may calculate the curved-surface function of the projected screen PS by using the equation (4) as the fitting function.

$$\sum_{k=1}^{M1} a_k X^{2k} + \sum_{k=1}^{M2} b_k Y^{2k} + d = Z \qquad (4)$$

Here, M1 and M2 are zeros or positive integers satisfying P≥M1+M2+1, and at least one of M1 and M2 is a positive integer. $a_k$, $b_k$, and d are constants and at least one of $a_k$ and $b_k$ is not zero. According to this configuration, in the equation (4), the Z coordinate term does not have a coefficient and terms of which order is an odd-number are not included compared to the equation (1) and thus, it is possible to make the number of unknown quantities small. With this, it is possible to achieve reduction of a time and reduction of processing load required for calculation of the curved-surface function.

E. Modification Example

The invention is not limited to the embodiments and examples described above and can be embodied by various forms in a range without departing from a gist thereof, and for example, the following modification may also be possible.

Modification Example 1

In the embodiment described above, although the image-capturing unit 300 is made to include two cameras 310 and 320, the image-capturing unit 300 may be made to include three or more cameras. In the latter case, the three-dimensional position coordinates (X, Y, and Z) may be determined based on m (m is an integer of 3 or more) images captured by m cameras. For example, $_mC_2$ combinations obtained by arbitrarily selecting two images from m images may be used to obtain respective three-dimensional position coordinates to determine the final three-dimensional position coordinate using an average of the three-dimensional position coordinates. Then, it is possible to further increase detection accuracy of the three-dimensional position coordinates.

Modification Example 2

In the embodiment described above, although the interactive projection system 900 is made operable in the whiteboard mode and PC interactive mode, the system may be configured to be operated at only one mode among the modes. The interactive projection system 900 may be configured to operate at a mode other than the two modes and also, may be configured to operate at a plurality of modes including the two modes.

Modification Example 3

In the embodiment described above, although all of irradiation detection light IDL, reflection detection light RDL, apparatus signal light ASL, and pointing element signal light PSL illustrated in FIG. 3 are set as near-infrared light, some or all of these may be light other than near-infrared light.

Modification Example 4

In the embodiment, detection of contact of the self-light emitting pointing element 70 is performed based on the light emitting patterns of pointing element signal light PSL emitted by the self-light emitting pointing element 70. However, the three-dimensional position of the tip portion 71 of the self-light emitting pointing element 70 is obtained by triangulation using the images captured by two cameras 310 and 320 and thus, it is also possible to execute detection of contact of the tip portion 71 of the self-light emitting pointing element 70 using the three-dimensional position.

As described above, although the embodiment of the invention is described based on several examples, the embodiment described above is made to easily understand the invention and is not intended to limit the invention. It is needless to say that the invention may be modified and improved without departing from a gist thereof and claims and equivalents to claims are included in the invention.

The entire disclosure of Japanese Patent Application No. 2015-065625, filed Mar. 27, 2015 is expressly incorporated by reference herein.

REFERENCE SIGNS LIST

70: self-light emitting pointing element
71: tip portion
72: shaft portion
73: button switch
74: signal light reception unit
75: control unit
76: tip switch
77: tip light-emitting portion
80: non-light-emitting pointing element
81: tip portion
100: interactive projector
200: projection unit
210: projection lens
220: optical modulation unit
230: light source
300: image-capturing unit
310: first camera
320: second camera
410: detection light irradiation unit
430: signal light transmission unit
500: projection image generation unit
510: projection image memory
600: position detection unit
700: control unit
780: pointing element
800: contact detection unit
820: function calculation unit
900: interactive projection system
910: support member
920: screen plate

The invention claimed is:

1. An interactive projector receiving an instruction by a pointing element of a user with respect to a projected screen, the interactive projector comprising:
    a projection unit that projects the projected screen on a screen surface;
    a plurality of cameras including a first camera and a second camera that capture an image of an area of the projected screen; and
    hardware circuitry that performs functions comprising:
        projecting a specific image on the screen surface by the projection unit, the specific image being used for detecting a position of the projected screen;
        capturing a captured image including the specific image by the plurality of cameras;
        detecting three-dimensional positions of a plurality of reference points, which are different from each other, on the projected screen based on the captured image;
        calculating a curved-surface function representing a three-dimensional shape of the projected screen based on the three-dimensional positions of the plurality of reference points;
        capturing a plurality of images including the pointing element by the plurality of cameras;
        detecting a three-dimensional position of the pointing element with respect to the projected screen based on the plurality of images which are captured by the plurality of cameras, the plurality of images including the pointing element;
        calculating a distance between the pointing element and the projected screen using the detected three-dimensional position of the pointing element and the calculated curved-surface function; and
        detecting contact of the pointing element with the projected screen based on the distance between the pointing element and the projected screen.

2. The interactive projector according to claim 1, wherein the hardware circuitry that performs functions further comprising:
    calculating the curved-surface function as a function represented by the equation (1), $$\sum_{j=1}^{N1} a_j X^j + \sum_{j=1}^{N2} b_j Y^j + \sum_{j=1}^{N3} c_j Z^j + d = 0 \quad (1)$$

wherein N1, N2, and N3 are zeros or positive integers satisfying P≥N1+N2+N3+1, and at least one of N1, N2, and N3 is a positive integer, P is the number of the reference points, $a_j$, $b_j$, and $c_j$, and d are constants, and at least one of $a_j$, $b_j$, and $c_j$ is not zero.

3. The interactive projector according to claim 1, wherein the hardware circuitry that performs functions further comprising:
    calculating the curved-surface function as a function represented by the equation (2), $$\sum_{j=1}^{N1} a_j X^j + \sum_{j=1}^{N2} b_j Y^j + d = Z \quad (2)$$

wherein N1 and N2 are zeros or positive integers satisfying P≥N1+N2+1, at least one of N1 and N2 is a positive integer, P is the number of the reference points, $a_j$, $b_j$, and d are constants, and at least one of $a_j$ and $b_j$ is not zero.

4. The interactive projector according to claim 1, wherein the hardware circuitry that performs functions further comprising:

calculating the curved-surface function as a function represented by the equation (3)

$$\sum_{k=1}^{M1} a_k X^{2k} + \sum_{k=1}^{M2} b_k Y^{2k} + \sum_{k=1}^{M3} c_k Z^{2k} + d = 0 \qquad (3)$$

wherein M1, M2, and M3 are zeros or positive integers satisfying P≥M1+M2+M3+1, at least one of M1, M2, and M3 is a positive integer, P is the number of the reference points, $a_k$, $b_k$, and $c_k$, and d are constants, and at least one of $a_k$, $b_k$, and $c_k$ is not zero.

5. The interactive projector according to claim 1, wherein the hardware circuitry that performs functions further comprising:

calculating the curved-surface function as a function represented by the equation (4), $$\sum_{k=1}^{M1} a_k X^{2k} + \sum_{k=1}^{M2} b_k Y^{2k} + d = Z \qquad (4)$$

wherein M1 and M2 are zeros or positive integers satisfying P≥M1+M2+1, and at least one of M1 and M2 is a positive integer, P is the number of the reference points, $a_k$, $b_k$, and d are constants, and at least one of $a_k$ and $b_k$ is not zero.

6. The interactive projector according to claim 1, wherein the hardware circuitry that performs functions further comprising:

determining an instruction content of the user based on the three-dimensional position of the pointing element when the contact of the pointing element with the projected screen is detected.

7. An interactive projection system comprising:
the interactive projector according to claim 1;
a screen plate that includes a screen surface on which the projected screen is projected; and a pointing element that includes at least one of a self-light emitting pointing element which includes a light-emitting portion emitting pointing element signal light in different light emitting patterns between at a time of contacting the projected screen and at a time of non-contacting the projected screen, and a non-light-emitting pointing element which does not include the light-emitting portion.

8. The interactive projector according to claim 1, wherein the hardware circuitry that performs functions further comprising:

determining that the pointing element is contact with the projected screen when the distance becomes zero or less than or equal to an error tolerance.

9. A control method of an interactive projector receiving an instruction by a pointing element of a user with respect to a projected screen, the control method comprising:

projecting a specific image on a screen surface, the specific image being used for detecting a position of the projected screen;

capturing a captured image including the specific image by a plurality of cameras including a first camera and a second camera;

detecting three-dimensional positions of a plurality of reference points which are different from each other, on the projected screen based on the captured image;

calculating a curved-surface function representing a three-dimensional shape of the projected screen based on the three-dimensional positions of the plurality of reference points;

capturing a plurality of images including the pointing element by the plurality of cameras;

detecting a three-dimensional position of the pointing element with respect to the projected screen based on the plurality of captured images;

calculating a distance between the pointing element and the projected screen, using the detected the three-dimensional position of the pointing element and the calculated curved-surface function; and detecting contact of the pointing element with the projected screen based on the distance between the pointing element and the projected screen.

10. The control method according to claim 9, further comprising:

determining that the pointing element is contact with the projected screen when the distance becomes zero or less than or equal to an error tolerance.

* * * * *